April 13, 1954   C. K. BRODERSON   2,674,880
VARIABLE AREA FLOWMETER
Filed April 25, 1952

Inventor: C. K. Broderson
By: [signature]
His Attorney

Patented Apr. 13, 1954

2,674,880

UNITED STATES PATENT OFFICE 2,674,880

VARIABLE AREA FLOWMETER

Charles Kendall Broderson, Norco, La., assignor to Shell Development Company, Emeryville, Calif., a corporation of Delaware Application April 25, 1952, Serial No. 284,370

6 Claims. (Cl. 73—207)

This invention relates to apparatus for measuring and/or recording the flow of fluids, and pertains more particularly to variable area constant differential measure flowmeters of the piston type which are especially adapted for metering fluids containing considerable amounts of solids.

The use of variable differential pressure type flowmeters to measure the flow of fluids containing solid matter has been found to be impractical because some of the solid matter tends to collect in front of the orifice plate or at the pressure taps in the pipe line where the flow is being measured. It is therefore desirable to employ a variable area constant differential pressure flowmeter of the piston type.

It is recognized that in a fluid having given properties, such as the charge fluid to the furnace of a cracked asphalt plant, fluid flow is primarily proportional to the cross-sectional area of the line and the square root of the pressure differential existing along the pipe line in consideration. Since a variable area flowmeter installed in a line tends to maintain a constant pressure differential by varying the cross-sectional area of the line, the changes in area bear a direct relationship to the flow through the meter.

Variable area flowmeters presently employed in fluid metering service generally comprise a floating piston vertically movable in a cylinder communicating with a substantially horizontal conduit which is arranged so that the inlet to the cylinder is slightly below the discharge port thereof so that the fluid flowing in the horizontal conduit impinges against the bottom of the piston. The position of the piston is determined at any instant by the fluid flow. Motion of the piston is translated into flow readings by means of a measuring bridge circuit or other suitable means.

While variable area flowmeters having horizontal inlet and outlet ports exhibit little tendency to become clogged by a fluid containing solids, large capacity flowmeters have been found to be inaccurate in the upper 50% of their range and cannot be successfully calibrated above their half-way point. It is therefore a primary object of the present invention to provide a variable area flowmeter wherein the displacement of the piston or float in a vertical plane is directly proportional to the flow of fluid through the flowmeter throughout the entire range of the flowmeter.

It is also an object of this invention to provide a variable area flowmeter of simple and sturdy design which is adapted to handle the flow of fluid containing large amounts of solid matter without becoming clogged by the solid matter and while requiring only a minimum amount of maintenance.

A further object of this invention is to provide a variable area flowmeter in which the fluid stream passing therethrough is directed in a straight line against the bottom of the flowmeter piston and then discharged to one side thereof, thus eliminating any syphoning effect from the flowmeter at high flow rates.

A still further object of the present invention is to provide a variable area flowmeter adapted to receive and discharge therefrom a fluid stream with a minimum of turbulence.

These and other objects of this invention will be understood from the following description taken with reference to the attached drawing wherein.

Figure 1:
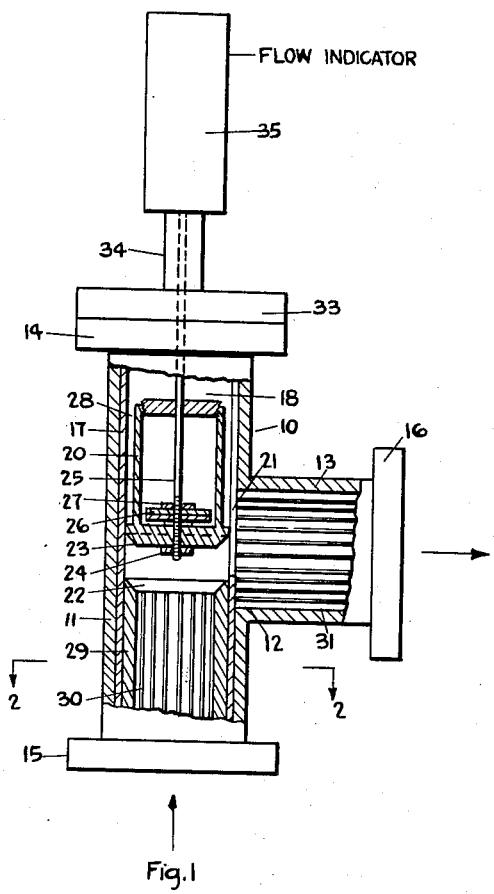
Figure 1 is an elevation view, partly in cross-section, of the present variable area flowmeter.

Referring to Figure 1 of the drawing, the present variable area flowmeter is contained in a housing 10 formed by a standard pipe T which comprises a vertically positioned tubular member 11 having an opening 12 through the wall thereof which is surrounded by a lateral outlet branch member 13. The three open ends of the housing T 10 are equipped with flanges 14, 15 and 16 or other suitable means for connecting the housing 10 into a pipe line or to other equipment, as desired.

The vertical tubular section 11 of the housing 10 is preferably lined with a sleeve 17 having a smooth-walled bore 18 in which a piston 20 is slidably mounted for vertical reciprocation. A fluid port 21, preferably rectangular in shape, is provided in the wall of the sleeve 17 which is in register with side port 12 in the housing 10. Formed or mounted on the inner wall of the sleeve 17 at a level below port 21 therein is a seat 22, preferably beveled, which is adapted to receive and be closed by the bottom 23 of the piston 20 which is beveled at the same angle. In the flowmeter illustrated, the beveled seat 22 is formed at the top of a second sleeve 29 which is inserted within the cylindrical liner 17 so that it is in substantially fluidtight engagement with the inner wall thereof. If desired, sleeve 29 may be omitted allowing the piston 20 to seat directly on a plurality of straightening vanes 30.

Fixedly secured to the piston 20 in any suitable manner, as by threads and a nut 24, is a piston rod 25 which extends upwardly from the center of the piston and up through the housing 10. The piston 20 is preferably hollow with a closed top in order to prevent solid matter from entering and settling inside, although the top thereof may be open, if desired. One or more discs 26 may be placed in the piston and removably secured to the piston rod by lock nut 27. The discs may be removed or additional discs inserted to vary the weight of the piston and hence the range of the flowmeter. It is obvious that any other suitable means, such as for example a quantity of lead shot, may be placed in the hollow piston 20 to vary its weight. Also, the piston 20 may be a solid member with the discs 26 being mounted on the top thereof.

A major length of the piston 20 above its seat 23 may be undercut or reduced in diameter forming an annular space 28 therearound, thus reducing the area of the piston in frictional contact with the inner wall of the sleeve 17. The annular space 28 also forms a passageway for fluid to flow up along the side of the piston 20 and act against the upper face of its bottom closure. If the piston is not undercut as illustrated, the opening 21 in the sleeve 17 may be extended upwardly, as shown, to form fluid conduit means between the bottom and top of the piston 20.

Figure 2:
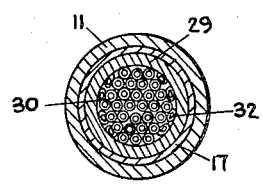
Figure 2 is a cross-sectional view taken along the line 2—2 of Figure 1.

Since it has been found that considerable turbulence normally exists within a variable area flowmeter which results in obtaining inaccurate flow readings, flow directing or straightening vanes 30 and 31 are mounted in the housing 10 below the piston 20 and in the branch member or outlet port 13, respectively. The flow straightening vanes 30 and 31 preferably comprise a plurality of short sections of tubing secured together in any suitable manner, as by welding, to form short tube bundles which can be inserted into the inlet and discharge ports of the flowmeter housing 10. Best results are obtained when sufficient tubes are employed so that the ports are substantially filled by the tubes as illustrated in Figure 2. Tubes of a malleable metal are preferred so that the tubes positioned against the wall of the inlet or outlet may be hammered to a shape which substantially conforms to the space to be filled, as shown at 32 in Figure 2. While straightening vanes formed by a tube bundle has been illustrated, it is understood that grids may be employed having square or triangular openings therethrough, or openings of any other shape.

The number and size of straightening vanes or tubes in each of the tube bundles 30 and 31 depends upon the turbulence in the flowmeter to be eliminated and the viscosity and solids content of the fluid being metered. For satisfactory results the inlet and outlet ports of the flowmeter housing 10 should be divided into a minimum of 4 flow channels by the straightening vanes 30 and 31 while for large size flowmeters (3 inches in diameter or more) the vanes 30 and 31 preferably form at least 8 flow channels. Excellent results were obtained when the inlet and outlet ports of a 3-inch (diameter) housing 10 were packed with short lengths of ½ inch copper tubing.

The top of the housing 10 is closed as by a bank flange 33 through which the piston rod 25 may extend. The length of the rod 25 extending above the flange 33 can be calibrated in flow readings. For accurate measurement and recording of fluid flow, the rod 25 preferably extends through the flange 33, a tubular connector 34 and into a flow indicator and recording device 35 which may be of the electrical, pneumatic or hydraulic type.

For example, motion of the flowmeter piston 20 may be translated into flow readings by means of an inductance bridge circuit which is available commercially, being described and illustrated as an inductance bridge transmitter in Catalog No. 2008, page 23, of the Brown Instrument Company, Division of Minneapolis-Honeywell Regulator Co. A similar device known as an electric impedance bridge coupling is described and illustrated in Catalog No. 50, page 5006, of Fischer and Porter Co. Any movement of the piston 20 of the flowmeter unbalances the bridge circuit, which is immediately returned to balance by a corresponding movement of the recording pen or indicator actuating armature of the recording device.

In operation with a given flow passing through the flowmeter housing, fluid entering the housing 10 in the direction of the arrow passes through the flow straightening vanes 30 and is directed against the underside of the piston 20. The flowing fluid exerts an upward force which raises the piston 20 exposing a section of the outlet port 21 in sleeve 17, as shown. As the fluid passes out port 21, it also flows upwardly along the annular space 28 formed by the undercut side of the piston or along the extended port 21 and exerts a downward pressure on the top of the bottom closure of piston 20 which is dependent upon the pressure of the fluid passing through port 21. The piston 20 attains a stationary position when the downward force due to the latter pressure, plus the weight of the piston 20 and any calibrating weights 26 which it contains, equals the upward inlet fluid pressure against the bottom of the piston 20.

Alternatively, in the event that the walls of the piston 20 are not undercut to provide flow channel 28 and port 21 is not extended upwardly along the piston 20, the weight of the piston constitutes the entire weight opposing the pressure applied by the flow stream against the bottom of the piston.

Thus, the piston 20 moves up or down with flow to vary or adjust the opening of port 21 so that a constant pressure differential is maintained between the high and low pressure sides of port 21. Fluid discharged from the port 21 in the sleeve 17 enters the flow directing vanes 31 in the branch port 13 of the housing 10 and is then discharged into a line (not shown) which may be connected to flange 16. It has been found that by employing flow directing vanes 30 and 31 in the inlet and discharge ports of the flowmeter housing 10 as described above, turbulence within the flowmeter is eliminated or reduced to a minimum and the displacement of the piston 20 therein is directly proportional to the flow of fluid through the flowmeter throughout its entire range.

I claim as my invention:

1. A variable area flowmeter comprising a vertically positioned tubular housing having horizontal port means through the wall thereof, a piston movable up and down within said housing in sliding contact with the inner wall thereof for opening and closing said port means, means closing the top of said housing, flow indicating means, a piston rod having its lower end secured to the piston, the upper end of said rod extending upwardly through said housing closure means and being connected to actuate said flow indicating means, first flow directing vanes positioned in the bore and extending parallel to the axis of the bore of said tubular housing below the horizontal port means thereof and second flow directing vanes positioned in said horizontal port means at right angles to said first flow directing vanes so that a fluid passing through said flowmeter flows parallel to the axis of the bore of said housing as it enters the flowmeter and parallel to the axis of said port means as it leaves said flowmeter.

2. A variable area flowmeter comprsing a vertically positioned tubular housing having horizontal discharge port means through the wall thereof, a piston movable up and down within said housing in sliding contact with the inner wall thereof for opening and closing said port means, the lower end of said tubular housing forming an inlet fluid port thereto whereby fluid entering said port impinges against the bottom of the piston, conduit means within said housing in communication between the discharge port means of said housing and the space above said piston for applying the discharge pressure thereto, means closing the top of said housing, flow indicating means, a piston rod having its lower end secured to the piston, the upper end of said rod extending upwardly through said housing closure means and being connected to actuate said flow indicating means, first flow directing vanes positioned in the bore and extending parallel to the axis of the bore of said tubular housing below the horizontal port means thereof and second flow directing vanes positioned in said horizontal port means at right angles to said first flow directing vanes so that a fluid passing through said flowmeter flows parallel to the axis of the bore of said housing as it enters the flowmeter and parallel to the axis of said port means as it leaves said flowmeter.

3. A variable area flowmeter comprising a vertically positioned tubular housing having horizontal port means through the wall thereof for discharging fluid from said housing, the lower end of said tubular housing being open and forming an inlet fluid port to said housing, a close-fitting sleeve lining said housing, said sleeve having port means through the wall thereof in register with the horizontal port means in said housing, a piston movable up and down within said sleeve in sliding contact with the inner wall thereof for opening and closing said discharge port means, means closing the top of said housing, flow indicating means, a piston rod having its lower end secured to the piston, the upper end of said rod extending upwardly through said housing closure means and being connected to actuate said flow indicating means, first flow directing vanes positioned in the vertical bore and extending parallel to the axis of the bore of said tubular housing below the horizontal port means thereof and second flow directing vanes positioned in said horizontal port means at right angles to said first flow directing vanes so that a fluid passing through said flowmeter flows parallel to the axis of the bore of said housing as it enters the flowmeter and parallel to the axis of said port means as it leaves said flowmeter.

4. A variable area flowmeter comprising a vertically positioned tubular housing having a horizontal port through the wall thereof for discharging fluid from said housing, the lower end of said tubular housing being open and forming an inlet fluid port to said housing whereby fluid entering the inlet port is directed vertically upward, a close-fitting sleeve lining said housing, said sleeve having port means through the wall thereof in register with the horizontal port in said housing, a piston movable up and down within said sleeve in sliding contact with the inner wall thereof for opening and closing said discharge port, conduit means within said housing in communication between the discharge port means of said housing and the space above said piston for applying the discharge pressure thereto, means closing the top of said housing, flow indicating means positioned above said closure means, a piston rod having its lower end secured to the piston, the upper end of said rod extending upwardly through said housing closure means and being connected to actuate said flow indicating means, first flow directing vanes positioned in the bore and extending parallel to the axis of the bore of said tubular housing below the horizontal port thereof and second flow directing vanes positioned in said horizontal port at right angles to said first flow directing vanes so that a fluid passing through said flowmeter flows parallel to the axis of the bore of said housing as it enters the flowmeter and parallel to the axis of said port means as it leaves said flowmeter.

5. A variable area flowmeter comprising a vertically positioned tubular housing having a horizontal port through the wall thereof for discharging fluid from said housing, the lower end of said tubular housing being open and forming an inlet fluid port to said housing whereby fluid entering the inlet port is directed vertically upward, a close-fitting sleeve lining said housing, said sleeve having port means through the wall thereof in register with the horizontal port in said housing, a piston movable up and down within said sleeve in sliding contact with the inner wall thereof for opening and closing said discharge port, conduit means within said housing in communication between the discharge port means of said housing and the space above said piston for applying the discharge pressure thereto, means closing the top of said housing, flow indicating means positioned above said closure means, a piston rod having its lower end secured to the piston, the upper end of said rod extending upwardly through said housing closure means and being connected to actuate said flow indicating means, seat means formed within the bore of said sleeve below the horizontal port means thereof for seating the piston, first flow directing vanes positioned in the bore and extending parallel to the axis of the bore of said tubular housing below the horizontal port thereof and second flow directing vanes positioned in said horizontal port at right angles to said first flow directing vanes, so that a fluid passing through said flowmeter flows parallel to the axis of the bore of said housing as it enters the flowmeter and parallel to the axis of said port means as it leaves said flowmeter, said first and second flow directing vanes dividing the inlet and discharge ports of said housing into a plurality of fluid flow channels.

6. A variable area flowmeter comprising a vertically positioned tubular housing having a horizontal port through the wall thereof for discharging fluid from said housing, the lower end of said tubular housing being open and forming an inlet fluid port to said housing whereby fluid entering the inlet port is directed vertically upward, a close-fitting sleeve lining said housing, said sleeve having port means through the wall thereof in register with the horizontal port in said housing, a piston movable up and down within said sleeve in sliding contact with the inner wall thereof for opening and closing said discharge port, conduit means formed between the piston and the inner wall of said sleeve in communication between the discharge port means of said housing and the space above said piston for applying the discharge pressure thereto, means closing the top of said housing, flow indicating and recording means positioned above said closure means, a piston rod having its lower end secured to the piston, the upper end of said rod extending upwardly through said housing closure means and being connected to said flow indicating means, seat means formed within the bore of said sleeve below the horizontal port means thereof for seating the piston, first flow directing vanes positioned in the bore and extending parallel to the axis of the bore of said tubular housing below said seat means and second flow directing vanes positioned in said horizontal port at right angles to said first flow directing vanes so that a fluid passing through said flowmeter flows parallel to the axis of the bore of said housing as it enters the flowmeter and parallel to the axis of said port means as it leaves said flowmeter, said first and second flow directing vanes each comprising a bundle of at least four tubular members fixedly secured within the inlet and discharge ports of said housing.

References Cited in the file of this patent

UNITED STATES PATENTS

| Number | Name | Date |
|---|---|---|
| 522,995 | Maxim | July 17, 1894 |
| 1,234,774 | Kocourek | July 31, 1917 |
| 1,811,364 | Olshevsky | July 23, 1931 |

FOREIGN PATENTS

| Number | Country | Date |
|---|---|---|
| 373,307 | France | Mar. 15, 1907 |
| 242,038 | Germany | Dec. 19, 1911 |